(12) United States Patent
Peterson

(10) Patent No.: US 6,425,597 B1
(45) Date of Patent: Jul. 30, 2002

(54) LIGHTWEIGHT WHEELCHAIR FRAME

(75) Inventor: Christopher J. Peterson, Tierra Verde, FL (US)

(73) Assignee: Invacare Corporation, Elyria, OH (US)

(*) Notice: Subject to any disclaimer, the term of this patent is extended or adjusted under 35 U.S.C. 154(b) by 0 days.

(21) Appl. No.: 09/712,547

(22) Filed: Nov. 14, 2000

Related U.S. Application Data

(62) Division of application No. 09/191,332, filed on Nov. 13, 1998, now Pat. No. 6,161,856.

(51) Int. Cl.[7] ................................................ B62M 1/14
(52) U.S. Cl. ................................................. 280/250.1
(58) Field of Search ........................... 280/250.1, 285, 280/286, 284, 301, 304.1, 124.128, 124.133; 297/195.1; 74/551.1; 180/907

(56) References Cited

U.S. PATENT DOCUMENTS

| 2,398,211 A | 4/1946 | du Pont |
| 2,949,153 A | 8/1960 | Hickman |
| 3,314,672 A | 4/1967 | Persson |
| 4,456,295 A | 6/1984 | Francu |
| 4,736,983 A | 4/1988 | Furbee |

(List continued on next page.)

FOREIGN PATENT DOCUMENTS

| EP | 0018101 | 10/1980 | |
| EP | 0369791 | 5/1990 | |
| EP | 0702945 | 3/1996 | |
| EP | 0841052 | 5/1998 | |
| FR | 27505 | 7/1924 | |
| FR | 2749502 | * 12/1997 | ............ A61G/5/00 |
| GB | 151915 | 10/1920 | |
| GB | 154369 | 12/1920 | |
| GB | 265885 | 2/1927 | |
| GB | 474349 | 10/1937 | |
| GB | 2238275 | 5/1991 | |
| IT | 250368 | 9/1926 | |
| WO | 9717929 | 5/1997 | |
| WO | 9744206 | 11/1997 | |

OTHER PUBLICATIONS

"Bike" magazine article "Ten Underrated Products You Probably Don't Own But Maybe Should" (in part) Jun. 1994, pp. 82 and 84.
"Bike" magazine article "Softride Contour" Mar. 1994, pp. 64 and 65.
"Mountain Bike Action" picture and caption describing "Body Shock", Jan. 1995, p. 48.
PCT International Search Report.

*Primary Examiner*—Anne Marie Boehler
*Assistant Examiner*—Tony Winner
(74) *Attorney, Agent, or Firm*—Hudak & Shunk Co., L.P.A.; Laura F. Shunk

(57) ABSTRACT

A wheelchair suspension system comprises a suspension assembly disposed adjacent to each wheel of the wheelchair, and attached to an interconnecting the axle of the wheels to the wheelchair frame. Each of the suspension assemblies includes a front bracket and a rear bracket, wherein the front bracket is attached to the wheelchair frame and the rear bracket is attached to the axle. Top and bottom generally L-shaped arms each are pivotally attached to each of the brackets in a diametrically opposed fashion, and an elastomeric spring is disposed between and interconnects the arms. When one or more of the wheels encounters a bump in a travel surface of the wheelchair, the arms pivot about the brackets, remain parallel to each other, and move closer together to compress the spring which absorbs a significant amount of shock caused by the bump. Further, the wheelchair has a frame with a pair of frame extensions that are supported by a transversely extending camber bar that journals the axles of thee wheelchair drive wheels. The drive wheels can be variably positioned with respect to the front casters by means of the frame extensions.

10 Claims, 6 Drawing Sheets

U.S. PATENT DOCUMENTS

| | | |
|---|---|---|
| 4,989,890 A | 2/1991 | Lockard et al. |
| 5,044,648 A | 9/1991 | Knapp |
| 5,301,964 A * | 4/1994 | Papac .................... 280/250.1 |
| 5,403,031 A | 4/1995 | Gottschalk et al. |
| 5,419,571 A * | 5/1995 | Vaughan ................ 280/250.1 |
| 5,489,139 A * | 2/1996 | McFarland .............. 297/195.1 |
| 5,727,809 A * | 3/1998 | Ordelman et al. .......... 280/650 |
| 5,772,048 A * | 6/1998 | Sopcisak .................... 211/20 |
| 6,161,856 A * | 12/2000 | Peterson ................. 280/250.1 |
| 6,168,178 B1 * | 1/2001 | Garven, Jr. et al. ...... 280/250.1 |
| 6,241,275 B1 | 6/2001 | Slagerman |
| 6,264,218 B1 | 7/2001 | Slagerman |

* cited by examiner

LIGHTWEIGHT WHEELCHAIR FRAME

CROSS-REFERENCE

This is a divisional of application Ser. No. 09/191,332, filed on Nov. 13, 1998 now U.S. Pat. No. 6,161,856, of Christopher J. Peterson for WHEELCHAIR SUSPENSION SYSTEM.

1. Field of the Invention

The invention relates to lightweight wheelchairs used for sports. More particularly, the present invention is directed to a wheelchair frame, which includes a pair of frame extension members that permit adjustment of the center of gravity by changing the length of the distance between the drive wheels and the front wheels.

BACKGROUND OF THE INVENTION

2. Background Art

Since the inception of the wheelchair, manufacturers and users of this device have continually attempted to improve its comfort, operation, portability, and appearance. One area of ongoing concern is the capability of the wheelchair to exhibit excellent shock absorption characteristics while at the same time being cost-effective and light-weight. A suspension system, of the type similar to those that can be found on other types of wheeled vehicles such as cars and trucks, is incorporated in a vehicle for several reasons. One reason is to absorb shocks and thereby insulate from shocks the people and/or cargo being carried by the vehicle. For example, during use of a wheelchair, small bumps, depressions or other irregularities on the surface on which the wheelchair is traveling can cause such shocks. Another common objective of a vehicle suspension that also applies to wheelchairs is to maintain all of the wheels of the vehicle on the ground when such relatively small bumps or depressions are encountered, in order to maintain steering control and stability of the vehicle. However, unfortunately, many known suspension systems are too expensive and/or too heavy for incorporation into many of today's lightweight and relatively inexpensive wheelchairs.

The present invention solves the above-described problems by incorporating a relatively simple, inexpensive, lightweight, yet effective suspension assembly adjacent to each wheel of the wheelchair, which in turn provides a relatively large amount of substantially vertical wheel displacement for absorbing shocks and for maintaining the steering control and stability of the wheelchair.

SUMMARY OF INVENTION

Objectives of the present invention include providing a wheelchair suspension system which absorbs and insulates the occupant of the wheelchair from shocks when relatively small bumps, depressions or other irregularities in a travel surface are encountered by the wheelchair.

Another objective of the present invention is to provide such a wheelchair suspension system in which all wheels of the wheelchair are maintained in constant contact with the travel surface when such bumps, depressions or other irregularities in the travel surface are encountered by the wheelchair, thereby maintaining occupant steering control and stability of the wheelchair.

A further objective of the present invention is to provide such a wheelchair suspension system which is economical to manufacture and install on a wheelchair, lightweight and reliable in use.

These objectives and advantages are obtained by the wheelchair suspension system of the present invention, the general nature of which may be stated as including at least one suspension system for a wheelchair, the suspension system including at least one suspension assembly interconnecting a frame of the wheelchair to an axle of at least one wheel of the wheelchair, the suspension assembly including top and bottom arms, each of the arms being pivotally and operatively attached at each of its ends to the frame and the axle; and a spring disposed between and attached to each of the arms, so that when the wheel encounters a bump in a travel surface, the arms pivot, the spring compresses and the axle moves in a substantially vertical upward direction, and when the wheel encounters a depression in a travel surface, the arms pivot, the spring is placed in tension and the axle moves in a substantially vertical downward direction.

BRIEF DESCRIPTION OF THE DRAWINGS

The preferred embodiment of the invention, illustrative of the best mode in which applicants has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
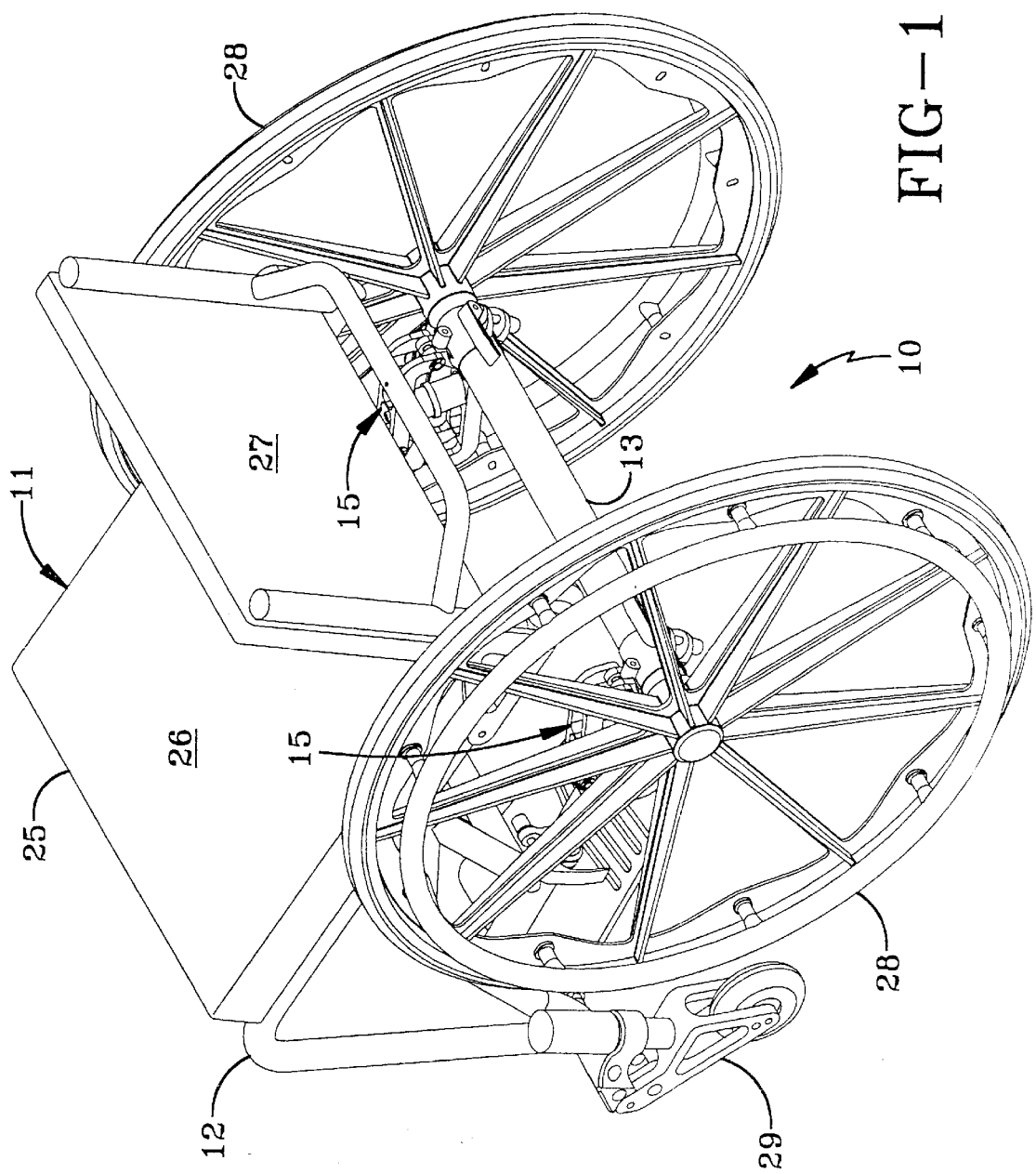
FIG. 1 is a rear perspective view showing one type of wheelchair on which the suspension system of the present invention is incorporated.
Figure 2:
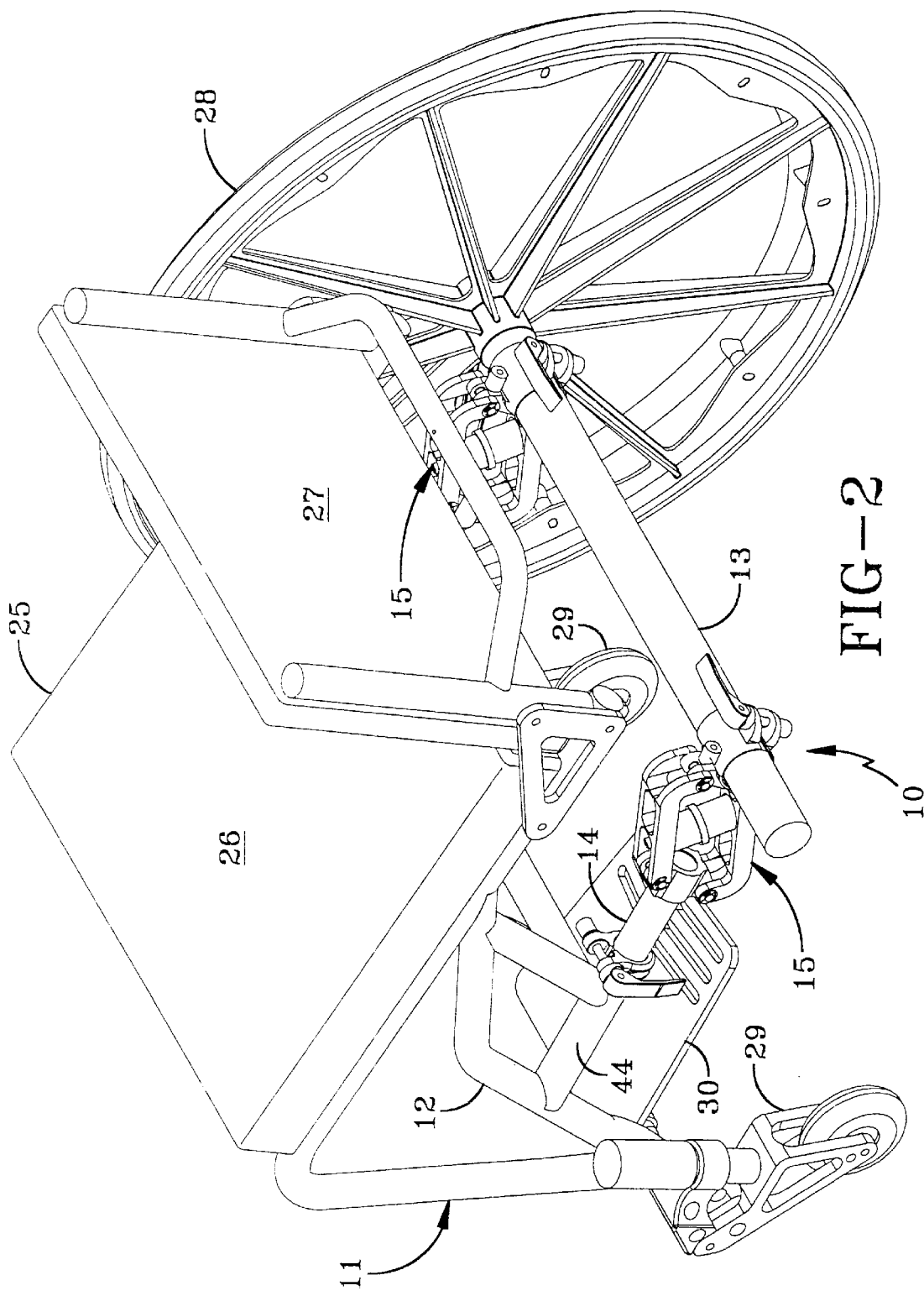
FIG. 2 is an enlarged view similar to FIG. 1, but with one of the wheels of the wheelchair removed to reveal the suspension assembly disposed adjacent to the removed wheel.
Figure 4:
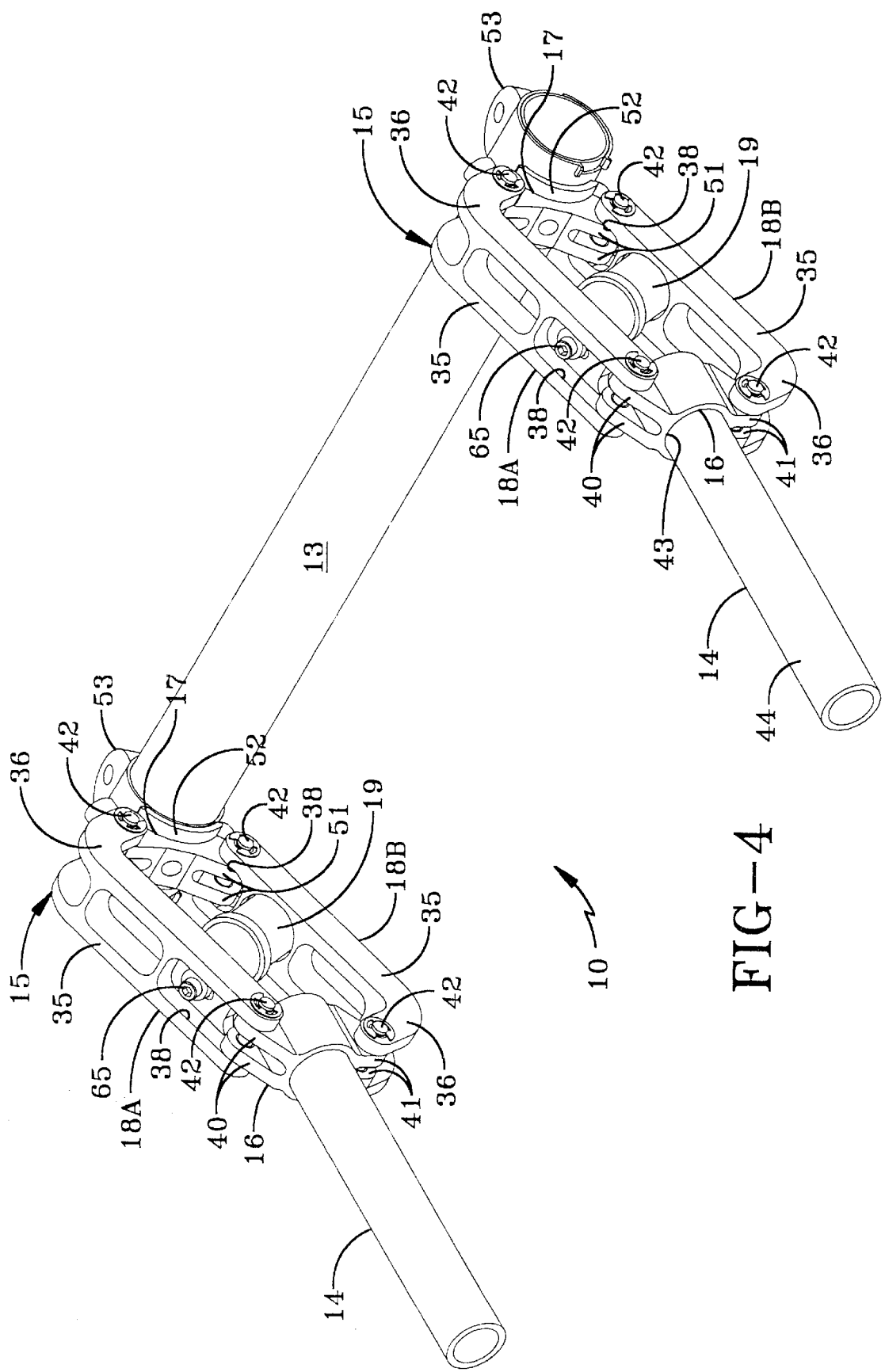
FIG. 4 is an enlarged front perspective view of the suspension system of the present invention, shown mounted on the axle of the wheelchair and with other parts of the wheelchair removed.

The suspension system of the present invention is indicated generally at 10, and is shown in FIG. 1 incorporated into a wheelchair 11 having a frame 12 and an axle 13. As best shown in FIGS. 2 and 4, suspension system 10 includes a pair of suspension assemblies 15 which are identical in structure and operation, so that only one suspension assembly will be described hereinbelow. Suspension assembly 15 includes a front bracket 16 and a frame extension 14 for attaching the suspension assembly to wheelchair frame 12, a rear bracket 17 for attaching the suspension assembly to one end of wheelchair axle 13, top and bottom arms 18a and 18b, respectively, each of which is pivotally attached to the front and rear brackets, and a spring 19 disposed between and interconnecting the top and bottom arms. Suspension assembly 15 is a trailing arm type suspension assembly, but it is understood that the concepts of the present invention also are applicable to leading arm or transverse arm suspension assemblies.

Figure 3:
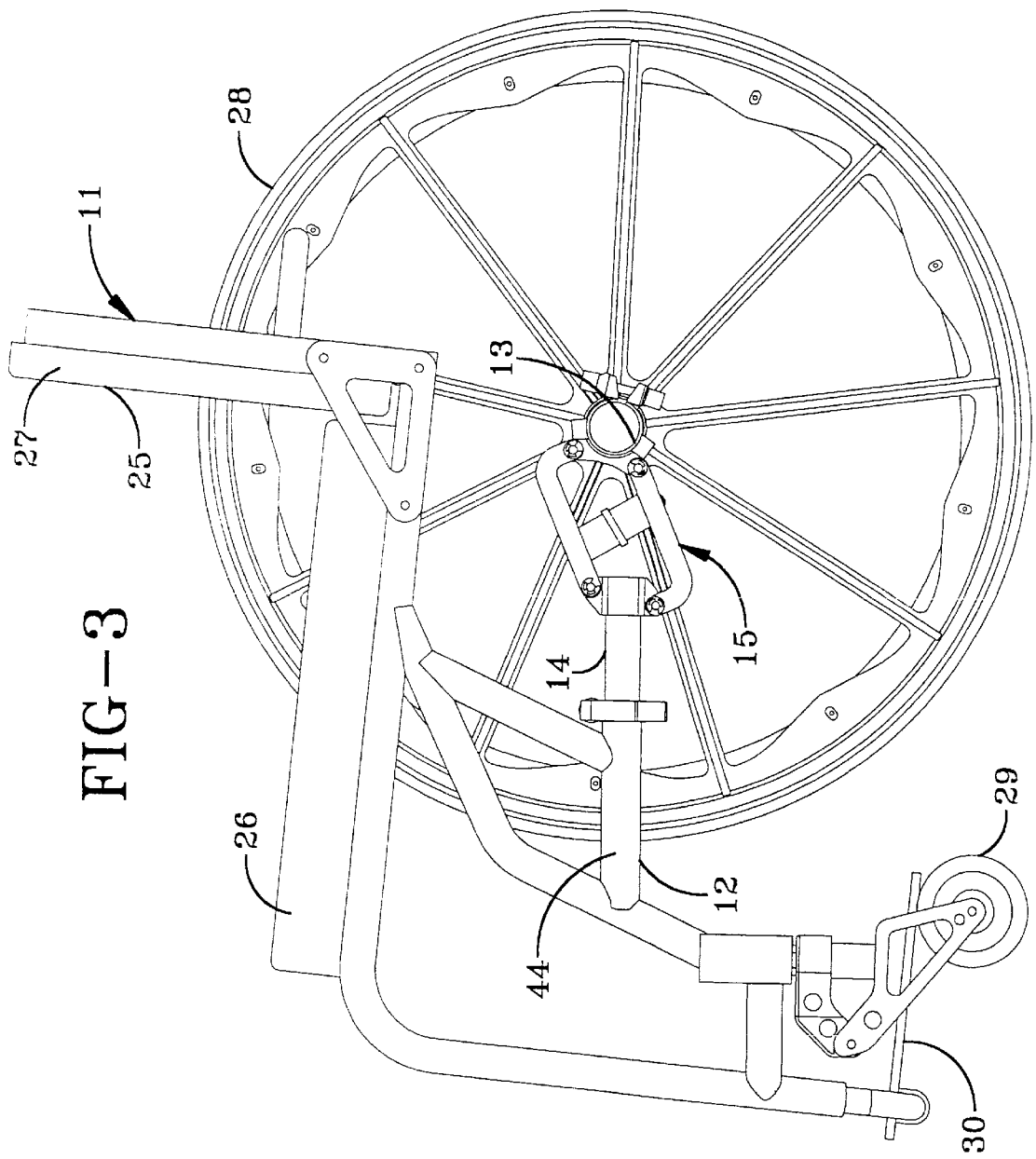
FIG. 3 is a left-hand side view of the wheelchair shown in FIG. 2.

Suspension system 10 of the present invention is shown in FIGS. 1 through 3 incorporated into wheelchair 11 of the type which generally is considered to be a lightweight sport wheelchair useful in outdoor and indoor sporting activities. However, it is understood that the present invention can be utilized on other types of wheelchairs, including non-rigid or folding wheelchairs which are free of an axle which extends between and interconnects the two main wheels of the wheechair, thereby making the wheelchair collapsible. However, so that one environment in which suspension system 10 can be used will be better understood, wheelchair 11 will be described in greater detail. As set forth hereinabove, wheelchair 11 includes frame 12 and axle 13. Wheelchair 11 further includes a seat 25 mounted on frame 12, wherein the seat includes a horizontal bottom portion. 26 and a vertical back support 27. A manually operable drive wheel 28, of a type which is well known in the wheelchair art, is mounted on each end of axle 13 in a usual manner. A pair of swivel casters 29 is mounted in spaced-apart relationship on the front of frame 12 forwardly from wheels 28. A footrest 30 also is mounted on the front of frame 12 between casters 29. It should be noted that wheelchair 11 of the type shown in FIGS. 1 to 3 typically is utilized in sporting activities such as basketball and the like, due to its light weight and stability as well as its ability to withstand side loads because of the interconnection of wheels 28 by axle 13. Moreover, it is understood that in this type of sport wheelchair 11, wheels 28 each are conventionally mounted on frame 12 with a camber (not shown), that is, the bottom portions of the wheels are set apart a greater transverse distance than are the top portions of the wheels.

Figure 5A:
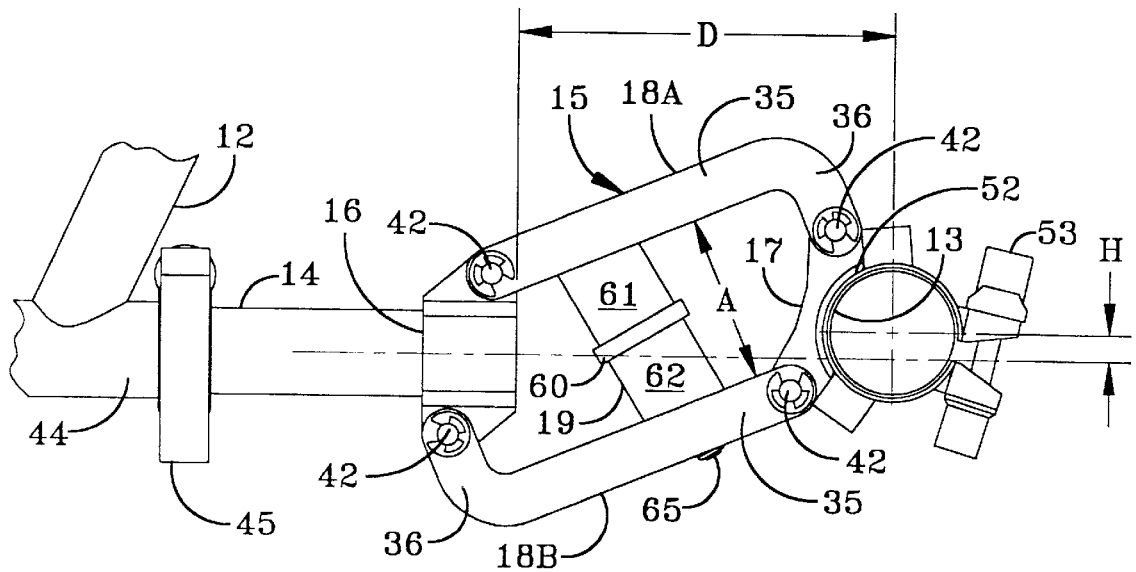
FIG. 5A is an enlarged fragmentary side view of one of the suspension assemblies of the suspension system, shown mounted on the axle and the frame of the wheelchair, and with other parts of the wheelchair removed.

Suspension assembly 15 and its incorporation into wheelchair 11 now will be described in detail. The components of suspension assembly 15 are formed of any suitable sturdy material such as metal, except where noted. Top and bottom suspension assembly arms 18a, b each is a generally L-shaped member (FIG. 5A). Each L-shaped arm 18a, b includes an elongated section 35 and a short section 36. Each short arm section 36 is formed with a cutout 37 (FIG. 5B) and a pair of spaced-apart transversely aligned openings (not shown). Similarly, each elongated arm section 35 is formed with a cutout 38 (FIG. 4) and a pair of spaced-apart transversely aligned openings (not shown).

Front bracket 16 is formed with a first pair of spaced-apart upwardly extending ears 40 and a second pair of spaced-apart downwardly extending ears 41 (FIG. 4). Each ear 40, 41 is formed with an opening (not shown), and each pair of ears is spaced apart a distance wherein the outermost surface of each ear abuts an innermost surface of its respective arm cutout 37, 38. The openings of first pair of ears 40 are aligned with top arm elongated section 35 openings and the openings of second pair of ears 41 are aligned with bottom arm short section 36 openings. A suitable fastener 42 is passed through the aligned openings of top arm elongated section 35 and first pair ears 40 to pivotally secure top arm 18a to bracket 16. Similarly, another fastener 42 is passed through the aligned openings of bottom arm short section 36 and second pair ears 41 to pivotally secure bottom arm 18b to bracket 16. Bracket 16 also is formed with a central opening 43 (FIG. 5B) for insertion of the rear end of frame extension 14, and the front end of the frame extension is inserted into frame 12. More specifically, wheelchair frame 12 and frame extension 14 each is formed of a tube-shaped metal, and the outside diameter of extension 14 is nominally smaller than the inside diameter of a rearwardly extending frame tube 44 and central bracket opening 43. The rear end of extension 14 is immovably secured in bracket opening 43 by any suitable means such as welding, and the front end of the extension is adjustably secured in the frame tube by a cam clamp mechanism 45 of a type that is well known to the art and to the literature (FIGS. 2, 3, 5A and 5B) However, although clamp 45 is preferred, it is understood that any type of clamp mechanism, set screw or the like could be used to adjustably secure extension tube 14 within frame tube 44. It should further be appreciated that the depth of insertion of each extension tube 14 within its respective frame tube 44 determines the front-rear position of wheels 28 relative to frame 12 and seat 25, thereby determining the center of gravity of wheelchair 11.

Figure 5B:
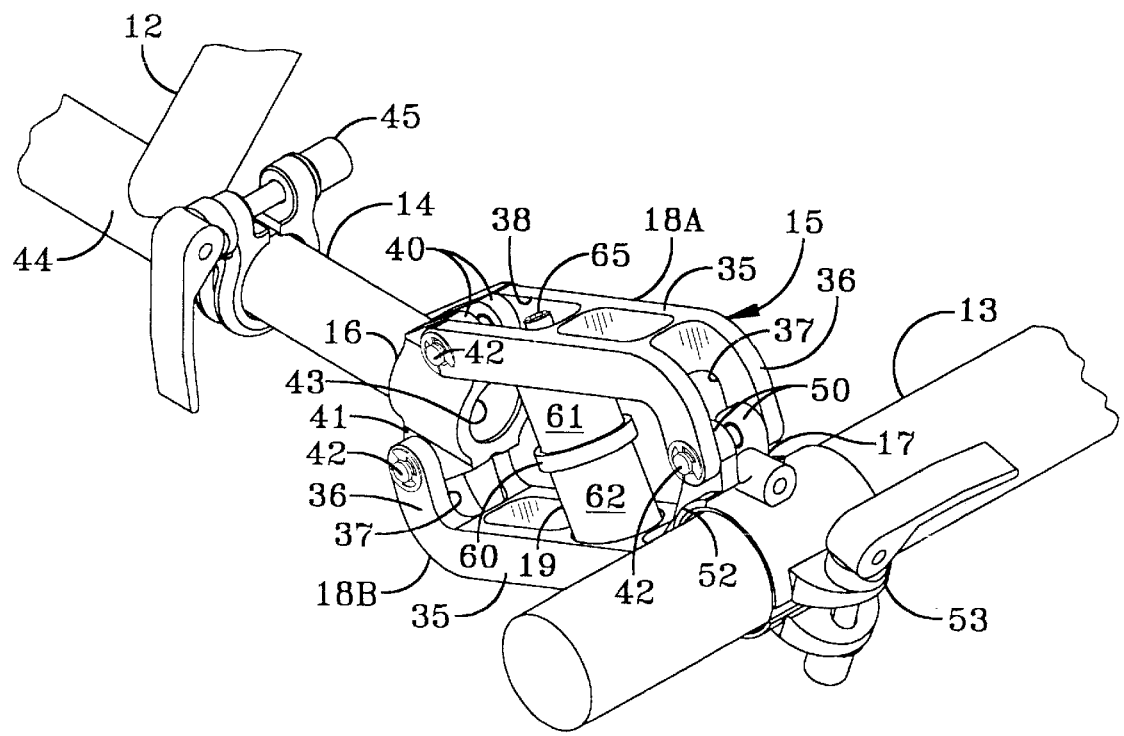
FIG. 5B is a rear perspective view of the parts shown in FIG. 5A.

Rear bracket 17 similarly is formed with a first pair of spaced-apart upwardly extending ears 50 and a second pair of spaced-apart downwardly extending ears 51 (FIGS. 4 and 5B). Each ear 50, 51 is formed with an opening (not shown), and each pair of ears is spaced apart a distance wherein the outermost surface of each ear abuts an innermost surface of its respective arm cutout 37, 38. The openings of first pair of ears 50 are aligned with top arm short section 36 openings and the openings of second pair of ears 51 are aligned with bottom arm elongated section 35 openings. A fastener 42 is passed through the aligned openings of top arm short section 36 and first pair ears 50 to pivotally secure top arm 18a to bracket 17. Similarly, another fastener 42 is passed through the aligned openings of bottom arm elongated section 35 and second pair ears 51 to pivotally secure bottom arm 18b to bracket 17. The rear surface of bracket 17 is attached to a saddle 52 such as by welds (not shown), and the saddle in turn is similarly attached to a cam clamp mechanism 53 which in turn is slidably mounted on the end of axle 13.

Figure 6A:
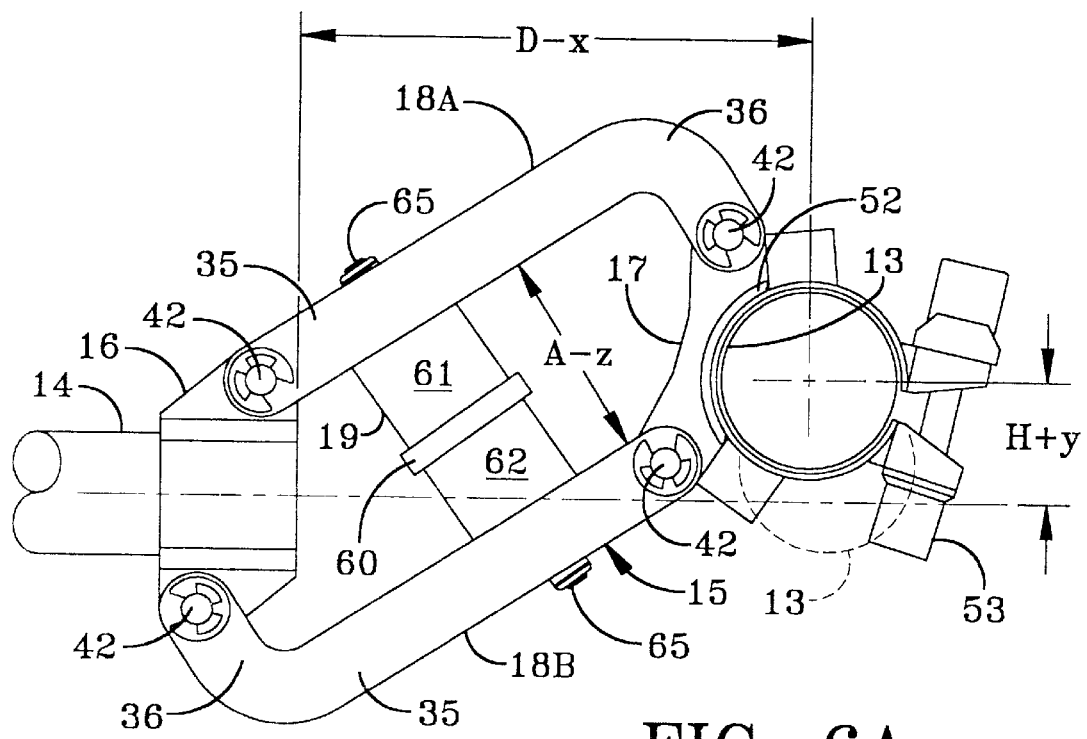
FIG. 6A is an enlarged view similar to FIG. 5A, but without showing any portion of the wheelchair frame, and showing the substantially vertical upward displacement of the axle when a bump is encountered in the travel surface of the wheelchair.

Spring 19 includes top and bottom cylindrical-shaped solid members 61, 62, respectively, with each member being formed of an elastomer having a type A durometer of from about 50 to about 100, preferably from about 60 to about 90, and most preferably from about 70 to about 80. An isolation plate 60 is disposed between and interconnects top and bottom members 61, 62 to provide additional stability to spring 19. As best shown in FIGS. 4 and 6A, spring 19 is mounted on and extends between elongated section 35 of top and bottom arms 18a, b by a pair of fasteners 65 of a type which are well known to one skilled in the spring art.

The operation of suspension system 10 of the present invention, and in particular each suspension assembly 15 thereof, can now be described. In its resting position, as best shown in FIG. 5A, a horizontal distance between the rear surface of bracket 16 and a central axis of axle 13 is represented by D. Moreover, a vertical distance between the central axis of axle 13 and a central axis of frame extension 14 is represented by H. In addition, a distance between the lowermost and uppermost surfaces of elongated sections 35 of top and bottom arms 18a, b, respectively, is represented by A. It can be seen in FIG. 6A that when a bump is encountered by one or both wheels 28 of wheelchair 11, arms 18 pivot about brackets 16 and 17 at fasteners 42 as axle 13 moves upward in response to the bump. This pivoting action causes arms 18a, b to visibly move close together from distance A (FIG. 5A) to distance A–z, where z is variable, and spring 19 correspondingly is compressed to absorb the shock of wheel 28 moving over the bump. However, elongated section 35 of each arm 18 remains parallel to the elongated section of the other arm, thereby enabling a relatively large amount of vertical travel H+y, where y is variable, of axle 13 and only a nominal amount of horizontal travel D–x, where x is variable, of the axle, thereby providing efficient absorption of up to about 50% of the shock by suspension assembly 15.

Figure 6B:
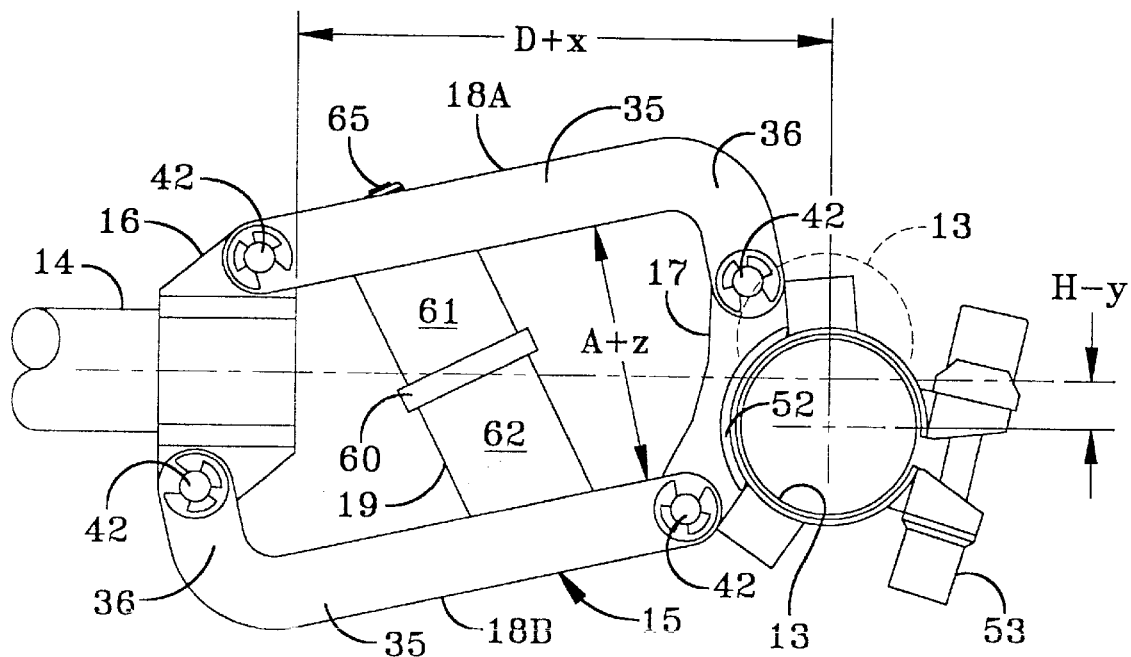
FIG. 6B is a view similar to FIG. 6A, and showing the substantially vertical downward displacement of the axle when a depression is encountered in the travel surface of the wheelchair.

Turning now to FIG. 6B, it can be seen that when one or both wheels 28 of wheelchair 11 encounters a depression in the travel surface of the wheelchair, arms 18 again pivot about brackets 16, 17 at fasteners 42 as axle 13 moves downward in response to the depression. This pivoting action causes arms 18a, b to visibly move farther apart from distance A to distance A+z, and spring 19 correspondingly is placed under tension to absorb the shock of wheel 28 dropping into the depression. Elongated section 35 of each arm 18 again remains parallel to the elongated section of the other arm, thereby enabling a relatively large amount of vertical travel H−y of axle 13 and only a nominal amount of horizontal travel D+x of the axle, again resulting in efficient absorption of up to about 50% of the shock by suspension assembly 15.

In accordance with one of the main features of the present invention, it should be understood that the displacement of axis 13 in a substantially vertical direction when a bump or depression is encountered in the travel surface of wheelchair 11, is an important factor in maintaining the center of gravity of the occupied wheelchair. This substantially vertical axle displacement also aids in keeping all of the wheels of the wheelchair in contact with the travel surface, to maintain the stability and steering control of the wheelchair. Moreover, suspension assembly 15 prevents axle 13 from traveling substantially in an arc, which in turn prevents toe-in of the already cambered wheels, which in turn also aids in maintaining all of the wheels in contact with the travel surface when irregularities in that surface are encountered.

Thus, it can be seen that the suspension system 10 of the present invention is useful on wheelchairs of any type to provide shock absorption and stability to the wheelchair when bumps, depressions or other irregularities in the travel surface of the wheelchair are encountered. Moreover, it can be seen that suspension system 10 is economical to make and install, reliable in use, and lightweight and easy to maintain.

Accordingly, the wheelchair suspension system of the present invention is simplified, provides an effective, safe, inexpensive and efficient suspension system which achieves all of the enumerated objectives, provides for eliminating difficulties encountered with prior wheelchair suspension systems, and solves problems and obtains new results in the art.

In the foregoing description, certain terms have been used for brevity, clarity, and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principle pies of the invention, the manner in which the wheelchair suspension system is constructed, arranged, and used, the characteristics of the construction and arrangement, and the advantageous, new and useful results obtained; the new and useful structures, devices, elements, arrangements, parts, and combinations are set forth in the appended

What is claimed is:

1. A main frame for a wheelchair having a front end and a rear end, said wheelchair main frame including:
   (a) at least one rearwardly extending frame extension member having a front end and a rear end, said extension member front end being attached to said main frame and said extension member rear end being directly attached through a suspension mechanism to a transversely extending axle of at least one wheel of the wheelchair, so that said axle can be selectively positioned relative to the main frame front and rear ends for adjusting the center of gravity of the wheelchair.

2. The wheelchair main frame of claim 1, which includes a pair of spaced-apart frame extension members; in which said wheelchair includes a pair of spaced-apart wheels; and in which each of said frame extension members is located adjacent to a respective one of said wheels.

3. The wheelchair main frame of claim 1, in which said main frame and said frame extension member each is formed of tubular metal; in which the outside diameter of the frame extension member is nominally smaller than the inside diameter of the main frame; and in which said frame extension member is telescopically engaged with the main frame.

4. The wheelchair main frame of claim 3, in which a cam clamp device is slidably disposed about said main frame and said telescopically engaged extension member, for clamping the main frame against the extension member to secure the extension member in a selected position, and for unclamping said main frame from said extension member to enable selective positioning of the extension member within the main frame.

5. The wheelchair main frame of claim 1, wherein said axle is journaled in a camber tube.

6. The wheelchair main frame of claim 5, wherein said wheelchair frame includes two of said rearwardly extending frame extension members which are spaced apart and which are cooperatively joined by said camber tube.

7. The wheelchair main frame of claim 6, wherein said frame supports a seat which is suspended above said frame extension members and not carried directly on said camber tube.

8. A lightweight sport wheelchair having a front end supported by a pair of casters and rear end, supported by a pair of drive wheels, said wheelchair having a frame including;
   a spaced pair of rearwardly extending frame members having a front end and a rear end, each of said extension member front ends being cooperatively attached to a caster wheel and each said extension member rear ends being directly attached through a suspension mechanism to a transversely extending axle of one of the drive wheels of the wheelchair whereby the axles can be selectively positioned relative to the caster wheels for adjusting the center of gravity of the wheelchair.

9. The wheelchair of claim 8, in which the frame has a main frame said frame extension members are each formed of tubular metal and the front ends form a cooperation with a main frame and further in which the outside diameter of each of the frame extension member is nominally smaller than the inside diameter of the corresponding main frame; and in which said frame extension member if telescopically engaged with the main frame.

10. The wheelchair main frame of claim 9, in which for each side a cam clamp device is slidably disposed about said main frame and said telescopically engaged extension member, for clamping the main frame against the extension member to secure the extension member in a selected position, and for unclamping said main frame from said extension member to enable selective positioning of the extension member within the main frame.

* * * * *